US012764442B2

(12) United States Patent
Trimble

(10) Patent No.: US 12,764,442 B2
(45) Date of Patent: Oct. 13, 2026

(54) REMOTE RADIO HEAD MOUNTING BRACKET AND METHOD FOR USE

(71) Applicant: Valmont Industries, Inc., Omaha, NE (US)

(72) Inventor: Joseph E. Trimble, Valparaiso, IN (US)

(73) Assignee: Valmont Industries, Inc., Omaha, NE (US)

( * ) Notice: Subject to any disclaimer, the term of this patent is extended or adjusted under 35 U.S.C. 154(b) by 69 days.

(21) Appl. No.: 18/938,368

(22) Filed: Nov. 6, 2024

(65) Prior Publication Data

US 2025/0159385 A1 May 15, 2025

Related U.S. Application Data

(60) Provisional application No. 63/597,424, filed on Nov. 9, 2023.

(51) Int. Cl.
*H04Q 1/02* (2006.01)

(52) U.S. Cl.
CPC .................................... *H04Q 1/09* (2013.01)

(58) Field of Classification Search
CPC .......... H04Q 1/09; H01Q 1/1228; H01Q 1/12; H01Q 1/125; H01Q 1/1242; H01Q 1/1207; F16M 13/02; H05K 5/0204
USPC ............................... 248/219.3, 218.4, 219.4
See application file for complete search history.

(56) References Cited

U.S. PATENT DOCUMENTS 4,819,394 A 4/1989 Compton
4,905,444 A 3/1990 Semaan et al.
4,993,670 A 2/1991 Tesar
5,718,403 A 2/1998 Ott et al.
5,846,018 A 12/1998 Frobosilo et al.
6,185,303 B1 2/2001 Losey
6,209,832 B1 4/2001 Yamazaki
6,213,679 B1 4/2001 Frobosilo et al.
6,298,629 B1 10/2001 Ador
6,298,630 B1 10/2001 VeRost et al.
6,679,017 B2 1/2004 Woodruff, III et al.
6,913,422 B2 7/2005 Rogers
7,213,376 B2 5/2007 Pulkkanen et al.
7,866,616 B2 1/2011 Wen et al.
12,196,365 B1 * 1/2025 Anselmo .............. F16M 13/022
2016/0294036 A1 * 10/2016 Christie ............... H01Q 1/1228
2017/0264005 A1 * 9/2017 Roy ..................... H01Q 1/1228
2022/0190462 A1 * 6/2022 Campbell .............. H01Q 1/125
2023/0087857 A1 * 3/2023 Anselmo ............ F16M 11/2078
248/200

* cited by examiner

*Primary Examiner* — Christopher Garft
(74) *Attorney, Agent, or Firm* — David H Milligan PC LLO

(57) ABSTRACT

An RRU bracket assembly for attachment to a tower frame pole. According to a preferred embodiment, the RRU bracket assembly of the present invention includes a front bracket plate and a rear bracket plate placed on either side of the frame pole and which are secured to the frame pole via one or more securing rods which are inserted through the front and rear bracket plates and tightened to create a frictional fit with the frame pole. The front bracket plate preferably includes an upper connection plate and a lower connection plate with each connection plate having bolt slots for allowing adjustable spacing between a right side wall and a left side wall.

20 Claims, 9 Drawing Sheets

REMOTE RADIO HEAD MOUNTING BRACKET AND METHOD FOR USE

RELATED APPLICATIONS

The present application claims priority to U.S. Provisional Application No. 63/597,424 filed Nov. 9, 2023.

FIELD OF INVENTION

The present invention is related in general to telecommunication tower design and, in particular, to a remote radio head mounting bracket and method for use.

BACKGROUND OF THE INVENTION

A remote radio unit (RRU), also called a remote radio head (RRH), is a remote radio transceiver within a telecom network that connects to an operator radio control panel via an electrical or wireless interface. In wireless system technologies, RRH equipment is used to extend the coverage of different telecom systems especially when mounted at elevation.

Each RRU is a complex and expensive piece of equipment. Most commonly, each RRU contains the base station's RF circuitry plus analog-to-digital/digital-to-analog converters and a variety of other sensitive electronics. For effective use, RRUs are most commonly attached to frame elements of vertical towers which allow the RRUs some distance from ground clutter and other EM interference sources.

Proper installation and secure mounting of each RRU is important for reliable operation and physical protection of the device. Because of this, proper attachment is crucial. At the same time, a single telecom operator may be responsible for thousands of individual RRUs which each must be individually installed and maintained by individual telecom engineers in the field. This attachment process requires significant man hours to secure each RRU while keeping each unit at a proper orientation.

Still further, where properly tapered vertical towers can be constructed and maintained, there exists the additional problem of efficiently connecting lateral spanning elements and wall elements to the tapered tower elements. Such attachment may require cranes, ropes, pulleys, and human exertion at elevation, in remote locations and in a wide variety of weather conditions. Still further, there are limitations which require the additional elements to match tower dimensions and be lightweight, easy to connect and add to the overall stability of the tower. Because of these reasons, tower elements such as RRUs are costly to install, restricted in size, and limited in variation and added benefits.

SUMMARY OF THE DISCLOSURE

To overcome the limitations of the prior art, the present invention provides an RRU bracket assembly for attachment to a tower frame pole. According to a first preferred embodiment, the RRU bracket assembly of the present invention preferably includes a front bracket plate and a rear bracket plate. The front bracket plate preferably includes an upper connection plate and a lower connection plate.

According to a first preferred method of installation, the front and rear bracket plates are preferably placed on either side of the frame pole and secured to the frame pole via one or more securing rods which are inserted through the front and rear bracket plates and tightened to create a frictional fit with the frame pole.

According to a first preferred embodiment, the RRU bracket assembly preferably includes a left side wall and right side wall which are attached to the upper and lower connection plates of the front bracket plate.

According to a further preferred embodiment, the left side wall preferably includes a left wall upper weldment, a left wall lower weldment and a left front wall weldment. Further, the right side wall preferably includes a right wall upper weldment, a right wall lower weldment and a right front wall weldment.

According to a further preferred embodiment, the left side wall is preferably attached to the front bracket plate with a left upper securing bolt which is inserted through the left wall upper weldment and the upper connection plate. According to a further preferred embodiment, the left side wall is further attached to the front bracket plate with a left lower securing bolt which is inserted through the left wall lower weldment and the lower connection plate.

According to a further preferred embodiment, the right side wall is preferably attached to the front bracket plate with a right upper securing bolt which is inserted through the right wall upper weldment and the upper connection plate. According to a further preferred embodiment, the right side wall is further attached to the front bracket plate with a right lower securing bolt which is inserted through the right wall lower weldment and the lower connection plate.

According to a further preferred embodiment, the left side wall and the right side wall are preferably connected via one or more front lateral bolts which are preferably inserted through the left front wall weldment and the right front wall weldment.

According to a preferred embodiment, the front bracket plate preferably includes an upper connection plate and a lower connection plate with each connection plate having bolt slots for allowing adjustable spacing between the right side wall and the left side wall.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

BRIEF DESCRIPTION OF THE DRAWINGS

Elements in the figures have not necessarily been drawn to scale in order to enhance their clarity and to improve the understanding of the various elements and embodiments of the invention. Furthermore, elements that are known to be common and well understood to those in the industry are not depicted in order to provide a clear view of the various embodiments of the invention. Thus, it should be understood that the drawings are generalized in form in the interest of clarity and conciseness.

DETAILED DESCRIPTION OF THE DRAWINGS

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

Figure 1:
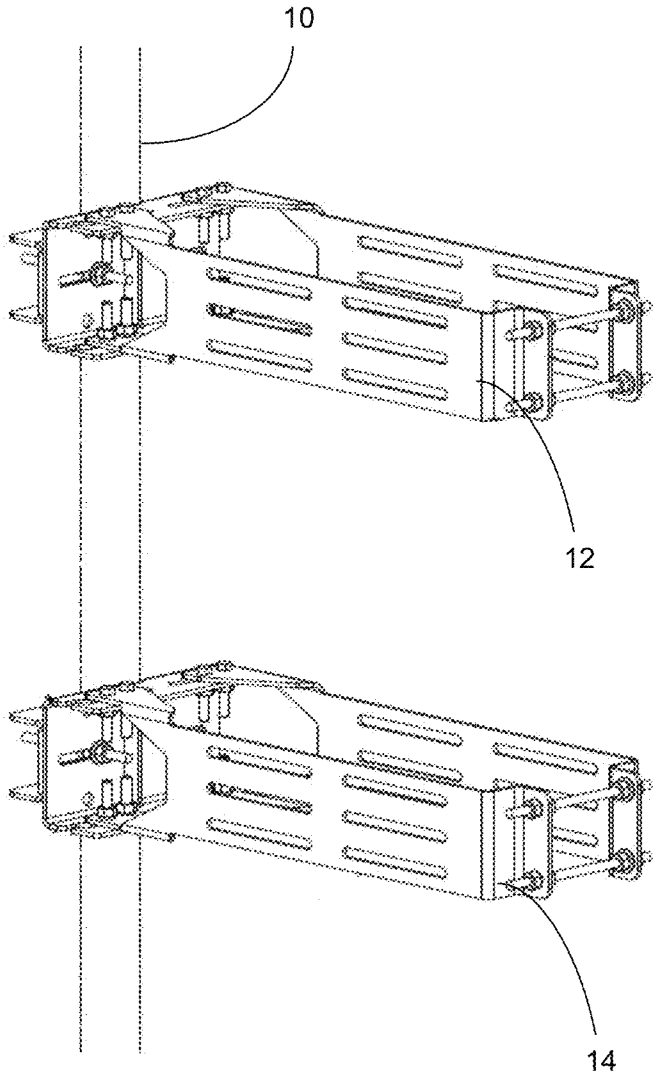
FIG. 1 illustrates a perspective view of a pair of RRU bracket assemblies attached to a tower element in accordance with a first preferred embodiment of the present invention.
Figure 2:
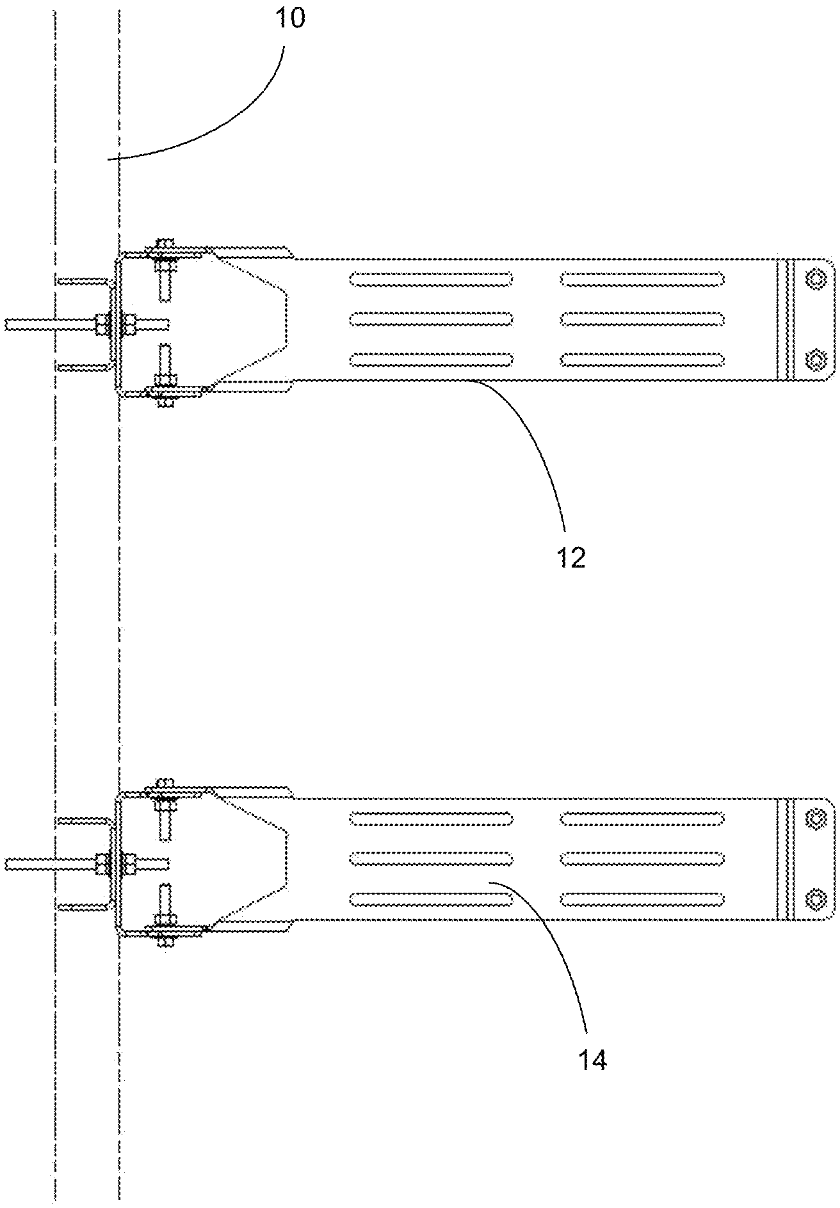
FIG. 2 illustrates a side view of the RRU bracket assemblies shown in FIG. 1.
Figure 3:
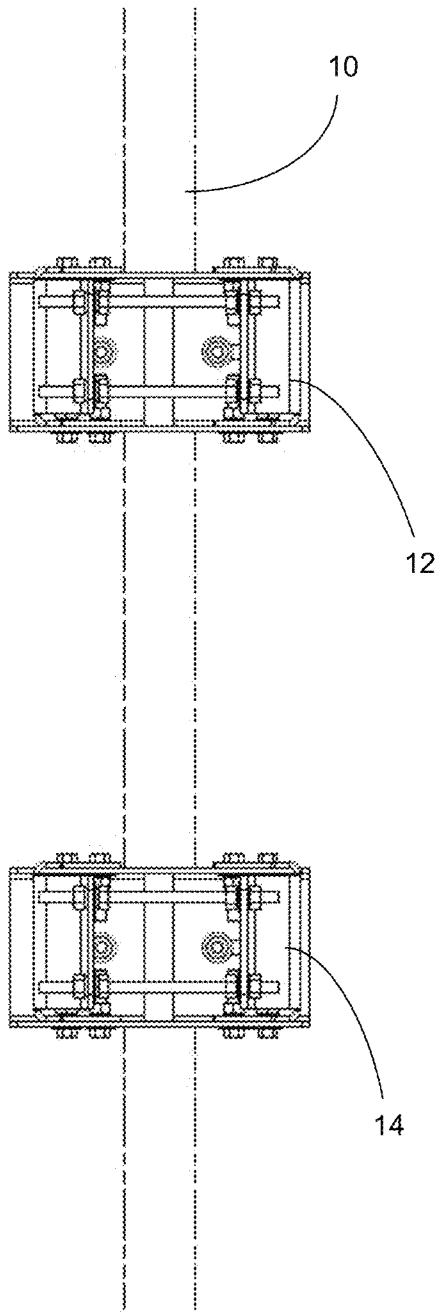
FIG. 3 illustrates a front view of the RRU bracket assemblies shown in FIG. 1.

With reference now to FIGS. 1-5, an exemplary RRU bracket assembly in accordance with a first preferred embodiment of the present invention shall now be discussed. As shown in FIG. 1, the RRU bracket assembly 12, 14 of the present invention may preferably be attached to various telecom tower frame members 10 without limitation. As shown in FIG. 1, the RRU bracket assembly 12 of the present may preferably be attached to a vertical pole 10 so that the RRU bracket assembly 12 extends laterally out from the tower frame member 10. As further shown in FIG. 1, multiple RRU bracket assemblies 12, 14 may preferably be attached to a single frame member 10. FIG. 2 illustrates a side view of the RRU bracket assemblies 12, 14 shown in FIG. 1. FIG. 3 illustrates a front view of the same bracket RRU bracket assemblies 12, 14.

Figure 4:
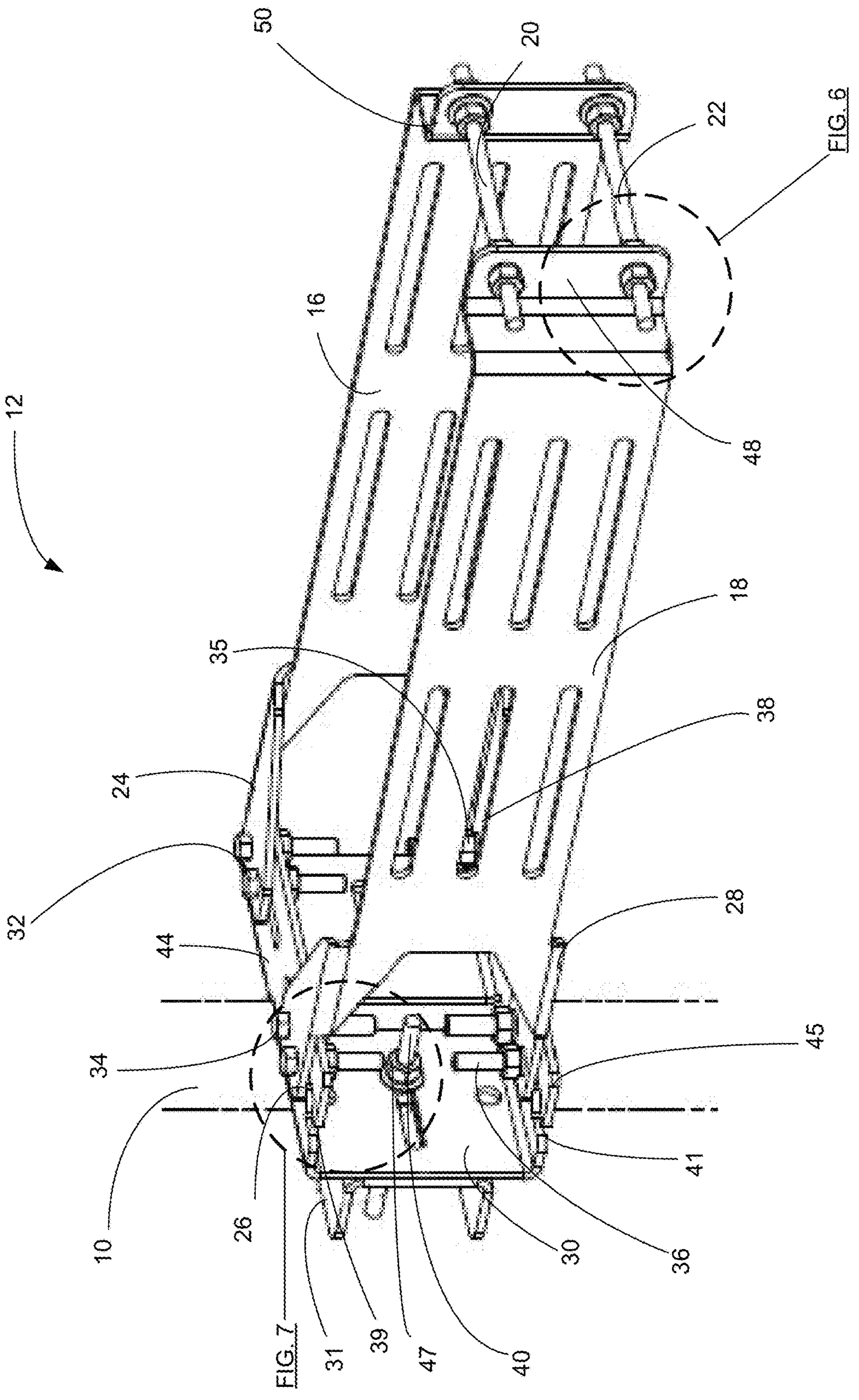
FIG. 4 is a perspective view of an RRU bracket assembly in accordance with a first preferred embodiment of the present invention.
Figure 5:
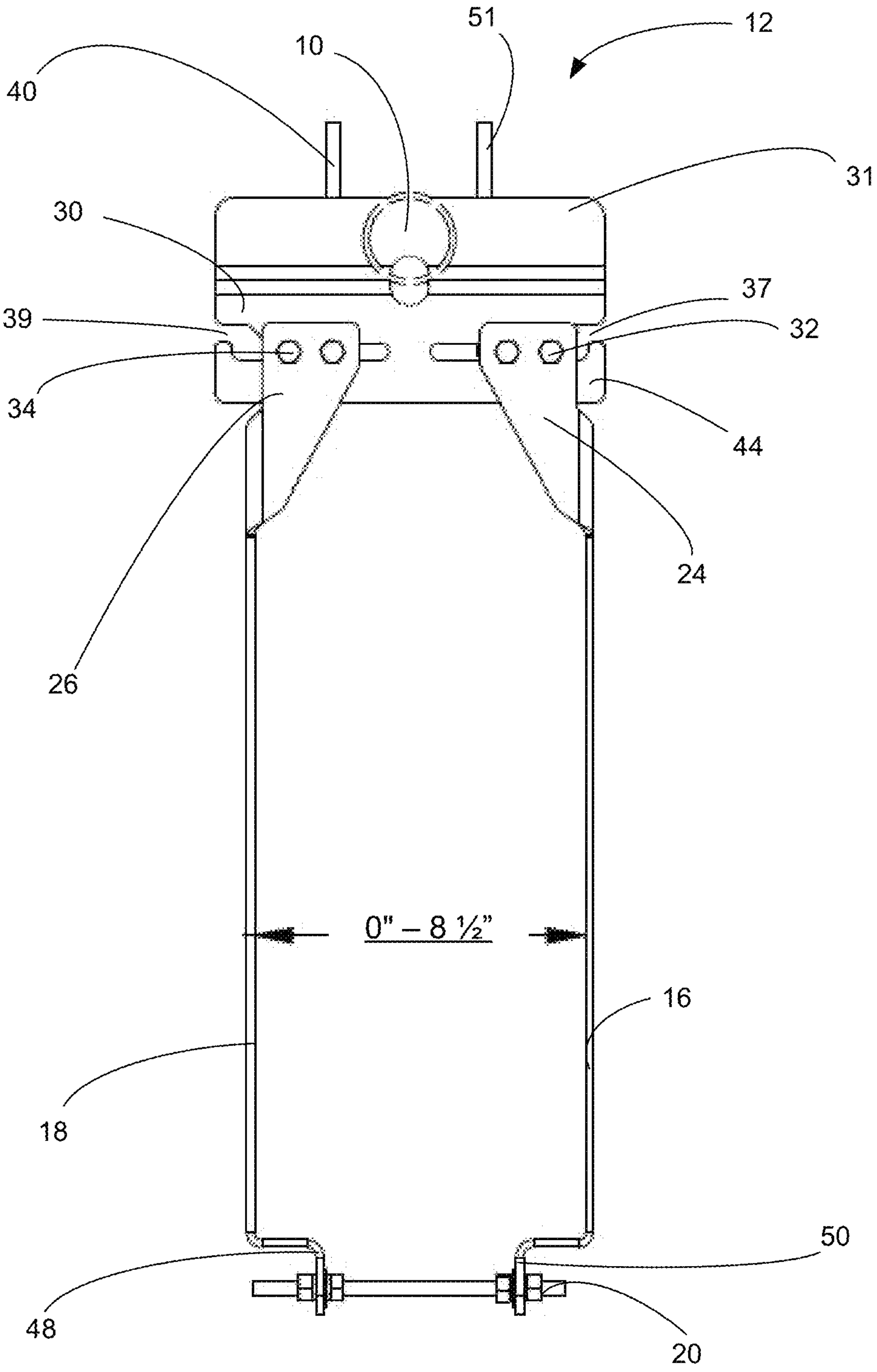
FIG. 5 illustrates a top-down view of the RRU bracket assembly shown in FIG. 4.

With reference now to FIGS. 4 and 5, detailed perspective and top-down views of an exemplary RRU bracket assembly 12 shall now be discussed. As shown, an RRU bracket assembly 12 of the present invention may include a front bracket plate 30 and a rear bracket plate 31 which are made to be connected together via one or more securing rods 40, 51 (shown in FIG. 5). The securing rods 40, 51 may preferably be tightened (via securing bolts 47 or the like) to compress a given tower element 10 between the front and rear bracket plates 30, 31 and thus form a frictional fit to secure the RRU bracket assembly 12 to the tower element 10.

As shown, the bracket assembly 12 preferably includes a left side wall 16 and right sidewall 18. The left side wall 16 preferably extends from a left wall upper weldment 24 and a left wall lower weldment 38 and terminates at a left front wall weldment 50. Similarly, the right side wall 18 preferably extends from a right wall upper weldment 26 and a right wall lower weldment 28 and terminates at a right front wall weldment 48. As shown in FIG. 5, the front bracket plate 30 preferably includes an upper connection plate 44 which horizontally extends out from the vertical front face 33 (shown in FIG. 7) of the front bracket plate 30. As further shown, the left side wall 16 may preferably be attached to the front bracket plate 30 via one or more left upper securing bolts 32 inserted through the left wall upper weldment 24 and the upper connection plate 44 of the front bracket plate 30. Similarly, the right side wall 18 may preferably be attached to the front bracket plate 30 via one or more right upper securing bolts 34 inserted through the right wall upper weldment 26 and the upper connection plate 44.

The left side wall 16 may preferably be further connected to the front bracket plate via one or more lower securing bolts 35 which are inserted through a left wall lower weldment 38 and the lower connection plate 45. The right side wall 18 may preferably be further connected to the front bracket plate 30 via one or more right lower securing bolts 36 inserted through the right wall lower weldment 28 and the lower connection plate 45.

Figure 6:
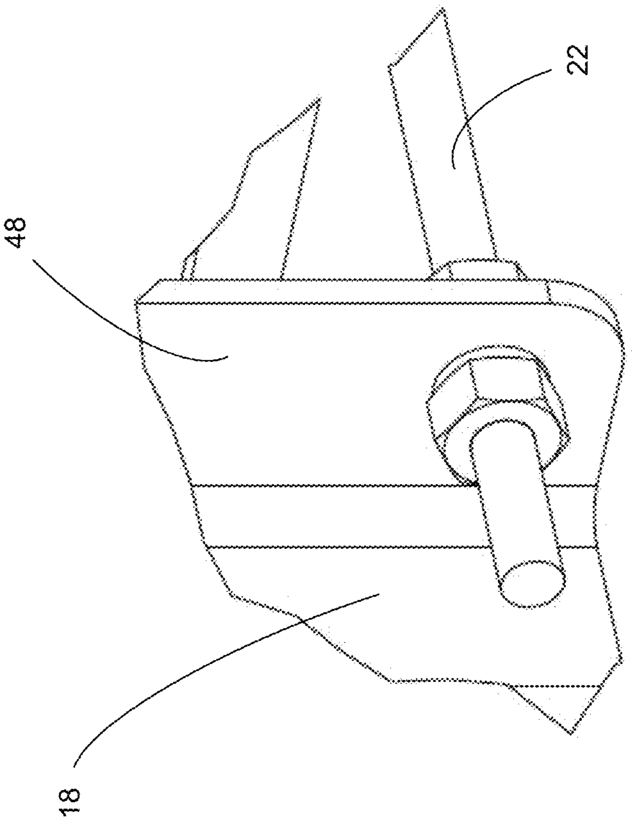
FIG. 6 illustrates an enlarged, cut-away view of a first section of the RRU bracket assembly as indicated in FIG. 4.

The right and left front wall weldments 48, 50 are preferably attached to each other via a front upper lateral bolt 20 and a front lower lateral bolt 22 which may preferably be inserted through the right and left front wall weldments and bolted in place. FIG. 6 provides an enlarged view of the connection between the right front wall weldment 48 and the front lower lateral bolt 22.

Figure 7:
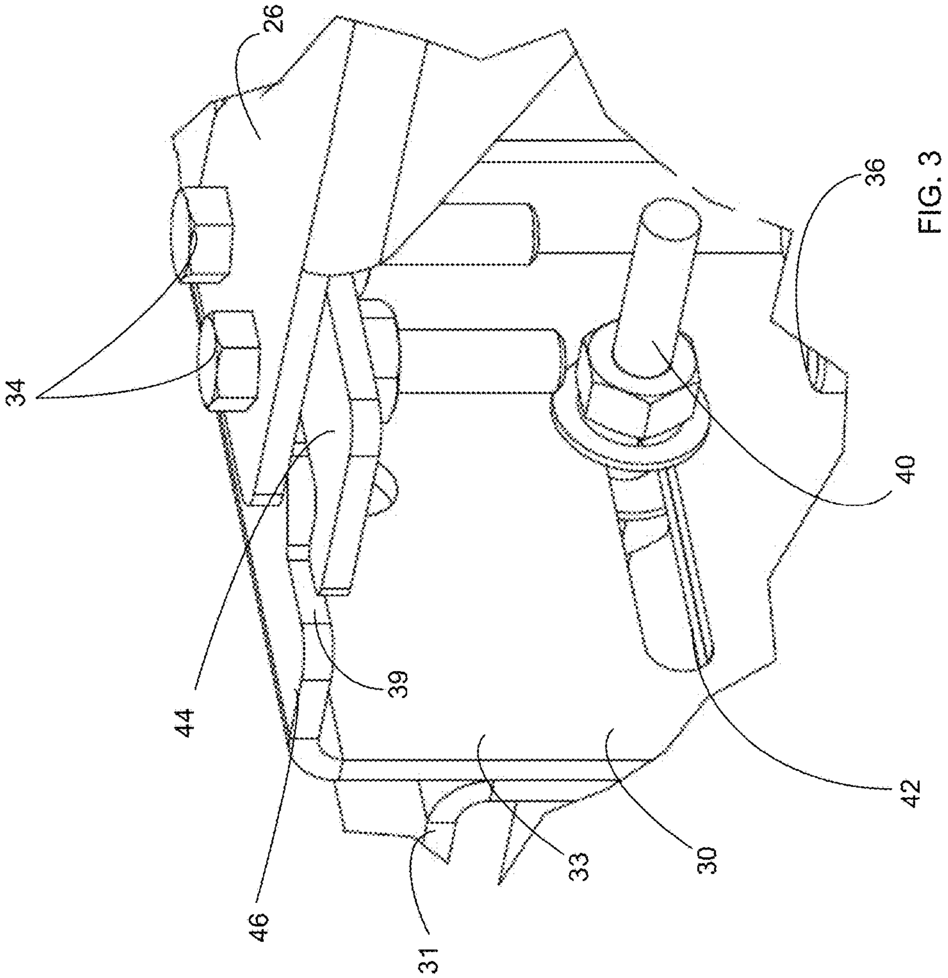
FIG. 7 illustrates an enlarged, cut-away view of a second portion of the RRU bracket assembly as indicated in FIG. 4.

Referring now to FIG. 7, a detailed view of the connection point between the right wall upper weldment 26 and the upper connection plate 44 is shown. As shown, the upper connection plate 44 may preferably extend from the front bracket plate top surface 46 of the front bracket plate 30. As further shown, the front bracket plate 30 may preferably include one or more securing rod slots 42 to allow the securing rods 40 (and 51 not shown) to extend through the front bracket plate 30. As further shown in FIG. 7 and as discussed above, the right side wall 18 may preferably be attached to the front bracket plate 30 via one or more right upper securing bolts 34 inserted through the right wall upper weldment 26 and the upper connection plate 44. To allow this insertion, one or more upper left and right upper bolt slots 39 (and 37 shown in FIG. 5) may preferably be formed within the upper connection plate 44 and/or between the front bracket plate 30 and the upper connection plate 44.

Figure 8:
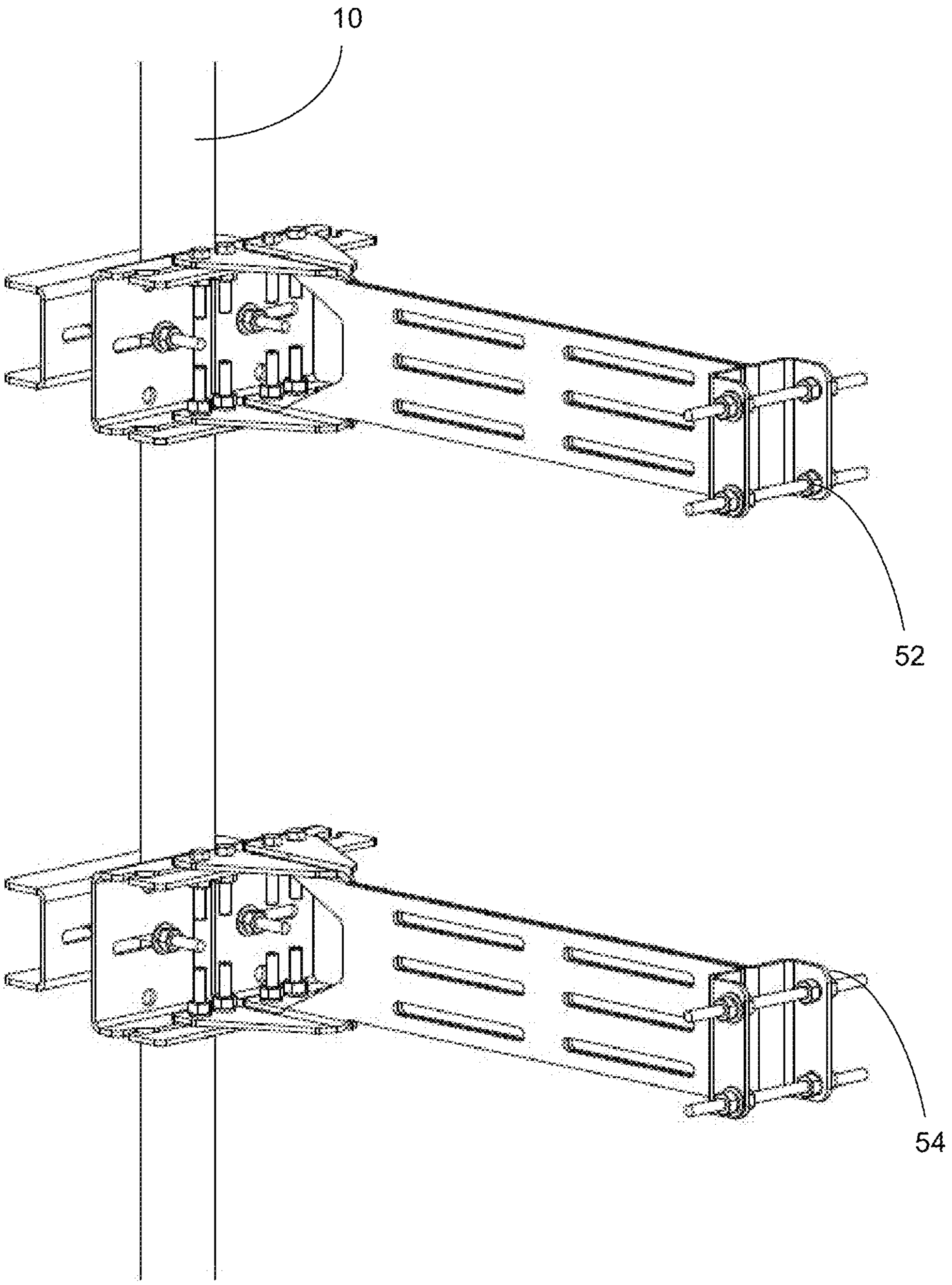
FIG. 8 illustrates a perspective view of a pair of RRU bracket assemblies attached to a tower element in accordance with an alternative preferred embodiment of the present invention.

Referring now to FIG. 8, a first alternative embodiment of the present invention shall now be discussed. As shown in FIG. 8, the elements of the RRU bracket assemblies discussed above may be arranged to produce the alternative RRU bracket assemblies 52, 54 of the present invention. Specifically, the elements may be alternatively configured so the right and left side walls 16, 18 are arranged in contact with each other or with minimal space between the walls 16, 18.

Figure 9:
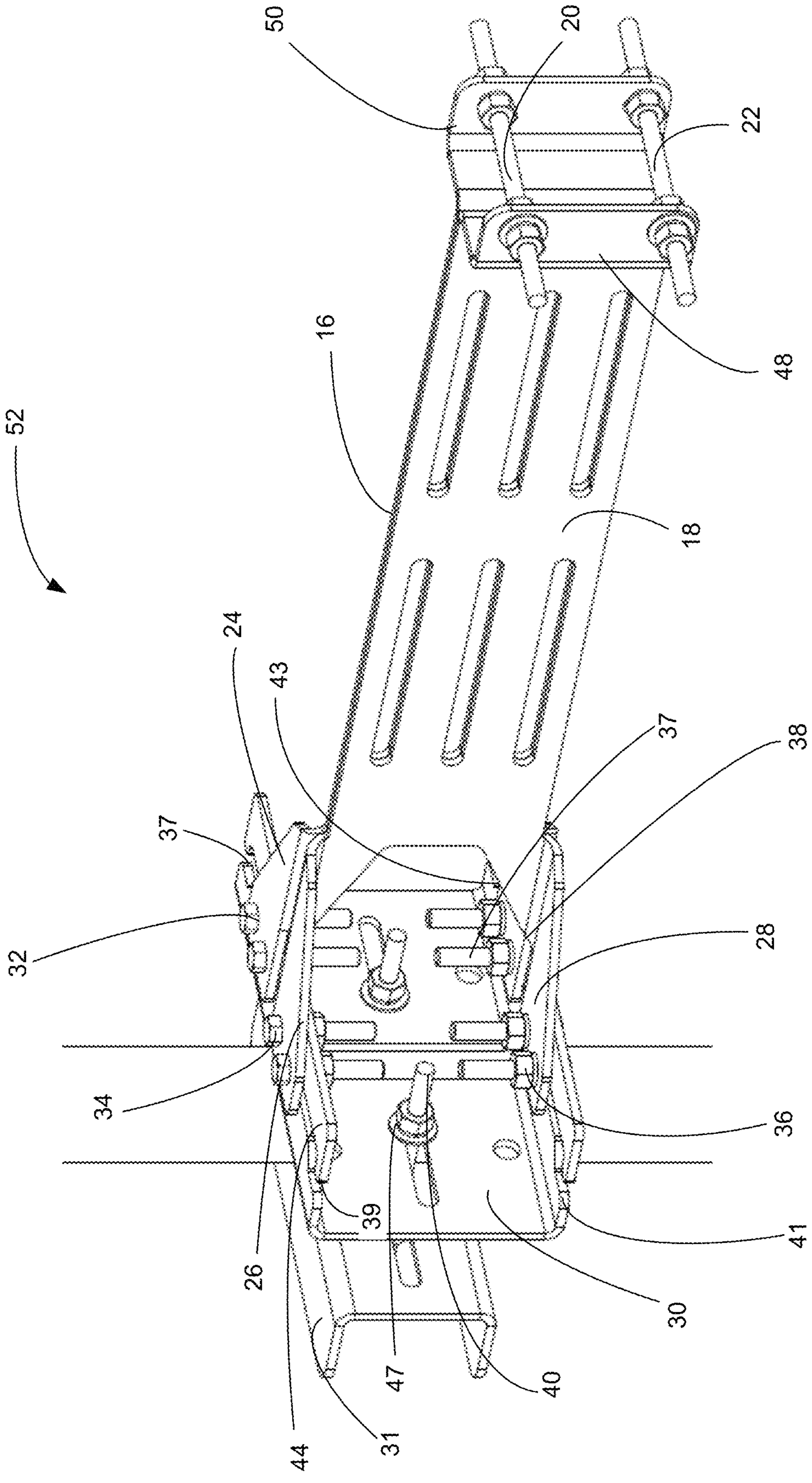
FIG. 9 illustrates a side, perspective view of one of the two RRU bracket assemblies shown in FIG. 8.

Referring now to FIG. 9, such an exemplary RRU bracket assembly 52 may be configured so that the right wall upper weldment 26 and the right wall lower weldment 28 are moved/positioned towards the center of the front bracket plate 30. In this arrangement, the right upper securing bolts 34 and right lower securing bolts 36 may preferably be inserted or slid within the right upper bolt slot 39 and the right lower bolt slot 41 respectively so that they are positioned towards the center of the front bracket plate 30.

Mirroring the position of the right side wall 18, the left side wall 16 may be similarly positioned by moving/positioning the left wall upper weldment 24 and the left wall lower weldment 38 towards the center of the front bracket plate 30. In this arrangement, the left upper securing bolts 32 and left lower securing bolts 37 may preferably be inserted or slid within the left upper bolt slot 37 and the left lower bolt slot 43 respectively so that they are positioned towards the center of the front bracket plate 30. In this way, the left and right side walls 16, 18 may preferably be positioned flush or nearly flush to one another. In accordance with further alternative embodiments, the distance between the right and left side wall 16, 18 may be varied and set to any given distance by inserting or sliding the respective upper and lower securing bolts 32, 34, 36, 38 within various positions within the respective bolt slots 37, 39, 41, 43.

Unless the context clearly requires otherwise, throughout the description and the claims, the words 'comprise,' 'comprising,' and the like are to be construed in an inclusive sense as opposed to an exclusive or exhaustive sense, that is to say, in a sense of 'including, but not limited to.' Words using the singular or plural number also include the plural or singular number respectively. Additionally, the words, 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combinations of the items in the list.

The above descriptions of illustrated embodiments of the above apparatus are not intended to be exhaustive or to limit the apparatus to the precise form disclosed. While specific embodiments of, and examples for, the apparatus are described herein for illustrative purposes, various equivalent modifications are possible within the scope of the disclosed apparatus as those skilled in the relevant art will recognize.

In the following claims, the terms used should not be construed to limit the apparatus to the specific embodiments disclosed in the specification and the claims. The disclosed apparatus is not intended to be limited by the disclosure, but instead the scope of the apparatus is to be determined entirely by the claims.

What is claimed is:

1. An RRU bracket assembly for attachment to a tower frame pole, wherein the bracket assembly comprises:

a front bracket plate; wherein the front bracket plate comprises a vertical front face, a rod securing slot, an upper connection plate and a lower connection plate;

a rear bracket plate;

a plurality of securing rods; wherein the plurality of securing rods extend through the front bracket plate and the rear bracket plate; wherein the front bracket plate and the rear bracket plate are spaced a first distance apart on either side of the tower frame pole; wherein the plurality of securing rods extend through the front bracket plate and the rear bracket plate; wherein the securing rods are configured to reduce the first distance and to form a frictional fit with the tower frame pole;

a left side wall; wherein the left side wall comprises a left wall upper weldment, a left wall lower weldment and a left front wall weldment;

a right side wall; wherein the right side wall comprises a right wall upper weldment, a right wall lower weldment and a right front wall weldment;

wherein the left side wall is attached to the front bracket plate with a left upper securing bolt; wherein the left upper securing bolt is inserted through the left wall upper weldment and the upper connection plate; wherein the left side wall is further attached to the front bracket plate with a left lower securing bolt; wherein the left lower securing bolt is inserted through the left wall lower weldment and the lower connection plate;

wherein the right side wall is attached to the front bracket plate with a right upper securing bolt; wherein the right upper securing bolt is inserted through the right wall upper weldment and the upper connection plate; wherein the right side wall is further attached to the front bracket plate with a right lower securing bolt; wherein the right lower securing bolt is inserted through the right wall lower weldment and the lower connection plate;

a front upper lateral bolt; and a front lower lateral bolt; wherein the front upper lateral bolt and front lower lateral bolt extend through the left front wall weldment and the right front wall weldment.

2. The mounting bracket assembly of claim 1, wherein said front bracket plate comprises bolt slots for adjustable positioning of said left and right side walls.

3. The mounting bracket assembly of claim 1, wherein a first distance between the front bracket plate and the rear bracket plate is adjustable.

4. The mounting bracket assembly of claim 1, wherein the assembly further comprises: a first securing rod nut and a second rod securing nut; wherein the first securing rod nut and the second rod securing nuts are configured to tighten and compress a tower frame element between the front and rear bracket plates to form a frictional fit.

5. A method for providing a mounting surface on a tower frame pole, the method comprising:

providing an RRU bracket assembly as claimed in claim 1;

positioning the front bracket plate and the rear bracket plate on opposite sides of a tower element;

inserting one or more securing rods through said front and rear bracket plates;

tightening said securing rods to create a frictional fit with the tower frame pole;

attaching the left side wall and the right side wall to said front bracket plate using securing bolts; and securing said left and right side walls to one another with one or more of the front lateral bolts.

6. The method of claim 5, further comprising: rotating one or more securing rod nuts to increase compression between the front and rear bracket plates.

7. The mounting bracket assembly of claim 1, wherein the upper connection plate comprises a left upper bolt slot and a right upper bolt slot configured to permit lateral adjustment of the left side wall and the right side wall relative to the front bracket plate.

8. The mounting bracket assembly of claim 1, wherein the lower connection plate comprises a left lower bolt slot and a right lower bolt slot configured to permit lateral adjustment of the left side wall and the right side wall relative to the front bracket plate.

9. The mounting bracket assembly of claim 1, wherein the left side wall and the right side wall are selectively positionable between:

a first configuration in which the left side wall and the right side wall are spaced apart from one another; and a second configuration in which the left side wall and the right side wall are positioned flush or substantially flush with one another.

10. The mounting bracket assembly of claim 1, wherein the upper connection plate extends outwardly from a top surface of the front bracket plate.

11. The mounting bracket assembly of claim 1, wherein the securing rods are threaded rods configured to receive securing nuts for compressing the front bracket plate and the rear bracket plate toward one another.

12. The mounting bracket assembly of claim 1, wherein the front upper lateral bolt and the front lower lateral bolt extend horizontally between the left front wall weldment and the right front wall weldment to maintain a fixed spacing between the left side wall and the right side wall.

13. The mounting bracket assembly of claim 1, wherein the front bracket plate comprises a plurality of rod securing slots configured to accommodate tower frame poles having different cross-sectional dimensions.

14. The mounting bracket assembly of claim 1, wherein the left upper securing bolt, the left lower securing bolt, the right upper securing bolt, and the right lower securing bolt are selectively movable within corresponding bolt slots to vary a second distance between the left side wall and the right side wall.

15. The mounting bracket assembly of claim 1, wherein the rear bracket plate is positioned parallel to the vertical front face of the front bracket plate when attached to the tower frame pole.

16. The mounting bracket assembly of claim 1, wherein the front bracket plate, rear bracket plate, left side wall, and right side wall are formed from metal materials resistant to outdoor environmental exposure.

17. The mounting bracket assembly of claim 1, wherein the left side wall and the right side wall extend laterally outward from the front bracket plate to support a remote radio unit at a spaced distance from the tower frame pole.

18. The mounting bracket assembly of claim 1, wherein the left side wall and the right side wall are independently adjustable relative to the front bracket plate to accommodate remote radio units having different widths.

19. The mounting bracket assembly of claim 1, wherein the front bracket plate and the rear bracket plate cooperate to clamp a cylindrical tower frame pole therebetween through compressive engagement generated by tightening the plurality of securing rods.

20. The mounting bracket assembly of claim 1, wherein the upper connection plate and the lower connection plate are spaced apart from one another along a vertical axis of the front bracket plate to provide vertical support stability for the left side wall and the right side wall.

* * * * *